US006639389B2

United States Patent
Binder et al.

(10) Patent No.: US 6,639,389 B2
(45) Date of Patent: Oct. 28, 2003

(54) ARRANGEMENT AND METHOD FOR PROTECTING MULTIPLE VOLTAGE SUPPLY SYSTEMS AGAINST VOLTAGE ARC-OVER BETWEEN DIFFERENT VOLTAGE PLANES AND AGAINST POLE REVERSAL FROM THE OUTSIDE

(75) Inventors: Thomas Binder, Stuttgart (DE); Roland Mauser, Ludwigsburg (DE); Rainer Mäckel, Königswinter (DE); Fritz Schmidt, Waiblingen (DE); Manfred Stege, Langen (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/098,609

(22) Filed: Mar. 18, 2002

(65) Prior Publication Data

US 2002/0130643 A1 Sep. 19, 2002

(30) Foreign Application Priority Data

Mar. 17, 2001 (DE) .......................... 101 13 081

(51) Int. Cl.⁷ .............................. G05F 1/40; H02H 9/00
(52) U.S. Cl. ............................ 323/266; 307/66; 361/18
(58) Field of Search ............................... 323/267, 266, 323/276, 274, 285, 271; 361/89, 86, 111, 56, 18, 91; 307/66, 87, 85, 64, 10.1, 10.8

(56) References Cited

U.S. PATENT DOCUMENTS

| 4,672,294 A | * 6/1987 | Norton ................... 320/123 |
| 5,021,727 A | * 6/1991 | Mshino ................... 323/267 |
| RE34,107 E | * 10/1992 | Wirth ..................... 361/18 |
| 5,166,538 A | * 11/1992 | Norton ................... 307/10.1 |
| 5,570,060 A | * 10/1996 | Edwards ................. 327/541 |

FOREIGN PATENT DOCUMENTS

DE 197 10 073 A1 10/1998

* cited by examiner

*Primary Examiner*—Rajnikant B. Patel
(74) *Attorney, Agent, or Firm*—Venable LLP; Norman N. Kunitz

(57) ABSTRACT

An arrangement and method for protecting a multiple voltage supply system against voltage arc-over between the different voltage planes. For this, the voltage in the low-voltage plane of the supply system is clamped to the low-voltage value with a voltage limiter until a battery disconnect switch in the high-voltage plane of the supply system is opened and the generator output voltage in the high-voltage plane is adjusted back to the voltage value of the low-voltage plane. As a result, the high-voltage plane of the supply system is disconnected from the high-voltage sources. Consequently, the voltage in the low-voltage plane is prevented from increasing even in case of a short-circuit between both voltage planes of the supply system and the consumers in the low-voltage plane can continue to be operated safely.

12 Claims, 2 Drawing Sheets

ARRANGEMENT AND METHOD FOR PROTECTING MULTIPLE VOLTAGE SUPPLY SYSTEMS AGAINST VOLTAGE ARC-OVER BETWEEN DIFFERENT VOLTAGE PLANES AND AGAINST POLE REVERSAL FROM THE OUTSIDE

BACKGROUND OF THE INVENTION

The invention relates to an arrangement and a method for protecting a multiple voltage supply system against voltage coupling between a high-voltage plane and a low voltage plane or against a pole reversal.

A device and a method for the arc-over protection of a single voltage supply system is known from DE 197 10 073 A 1. An arc-over protection device for protecting the electrical consumers or loads located in the supply system is connected in parallel with the generator output. The arc-over protection device contains a limiting unit for the supply system. The threshold value for the limiting unit is above the value for the generator voltage. If the supply system voltage exceeds this threshold value, the generator output is clamped at the threshold value with the aid of a parallel-connected sacrificial consumer and the generator voltage is simultaneously adjusted or regulated down. As a result, sensitive semiconductor elements are protected against supply system arc-over.

With supply systems in several voltage planes, for example, a two-voltage supply system 42 V/14 V, voltage arc-over, short-circuits or pole reversals between two voltage planes of the supply system can occur in addition to short-circuits of the individual supply systems toward ground. The time history and the absolute values of the voltages in the different voltage planes of the supply system depend on many factors during the voltage arc-over between voltage planes. Among other things, these factors include the number, size, type and technological level of the batteries used in the supply system, as well as their charging state and aging condition. Furthermore included are the type and number of contact resistances and power resistances in the supply system, the number and type of elements connected between the voltage planes and the intensity and location of the voltage arc-over in the supply system. In particular the location of an unintended voltage coupling in the supply system greatly influences the resulting voltage distribution. Owing to the fact that the location of a voltage coupling or short-circuit in the supply system cannot be predicted, the results of a voltage arc-over between the voltage planes in known multiple voltage supply systems cannot be predicted either. To be sure, the individual voltage planes normally are protected against a short circuit to ground, but this protection does not provide any or only insufficient help in case of a short circuit between the voltage planes. This is particularly important for motor vehicles having safety-relevant control devices, such as ESP (external power source) control devices, airbag control devices, ABS (anti-locking system) control devices, the reliable operation of which must be ensured even in the case of a voltage arc-over. Depending on the locally adjusting voltage potential, consumers connected to the supply system can be placed in a state of over voltage or undervoltage, depending on their layout for low voltage or high voltage. In the case of the previously mentioned, safety-relevant control devices, an operational loss must then be expected for these control devices.

If a high-voltage battery is installed in the high-voltage plane and a low-voltage battery in the low-voltage plane, an uncontrolled voltage arc-over between the two voltage planes of the supply system becomes even more dangerous. As a result of the coupling between two batteries from different voltage planes, high compensating currents can flow that can destroy all components of the supply system, including the batteries themselves.

For example, if the high-voltage plane is connected due to a short circuit to a line of the low-voltage plane and to a MOS semiconductor switch and the load triggered by this switch in the low-voltage plane, then the normally existing inverse diode of the MOS switch is destroyed and the connected load will switch on without control. This can lead to unpredictable driving conditions for motor vehicles in particular, depending on the type of load that is activated without control, which cannot be tolerated.

The same, previously described dangers also arise if a high-voltage system component is connected to the low-voltage plane, for example as a result of pole reversal or confusion. The danger of confusing the planes always exists, for example, during the external charging of motor vehicle batteries or if an external starting aid is used.

Thus, it is the object of this invention to provide better protection for multiple voltage supply systems against uncontrollable voltage coupling between the different voltage planes of the supply system.

SUMMARY OF THE INVENTION

The above object is achieved according to the present invention by an arrangement for protecting a multiple voltage supply system against voltage coupling between a high-voltage plane and a low voltage plane or against a pole reversal, with the high voltage plane including a high voltage battery, a controllable generator connected to the high voltage battery, and at least one high voltage load connected to the battery and the generator, and with the low-voltage plane including a low voltage battery and at least one load connected to the low voltage battery, and with the arrangement comprising: a voltage-limiting unit connected, as to potential, between battery in the low-voltage plane and electrical ground to limit the voltage at the low voltage plane; a normally closed controllable battery disconnect switch connected in the high-voltage plane to disconnect the high voltage battery from the generator and the at least one load when opened; and, control signal lines connecting control terminals of the voltage-limiting unit, the battery disconnect switch and the generator to each other; and wherein the voltage limiting unit includes circuit means for, upon detection of an undesirable voltage coupling from the high-voltage plane to the low-voltage plane, keeping the voltage in the low-voltage plane constant, and for transmitting a signal via the signal lines (a) to the battery disconnect switch to open the switch and separate the high-voltage plane from the high-voltage battery, and (b) to the control terminal of the generator and to adjust the output voltage of the generator down.

Generally, in the above case of a voltage coupling between the high-voltage plane and the low-voltage plane, the above object is solved by clamping the voltage in the low-voltage plane of the supply system with a voltage limiter to remain at the low-voltage value until a battery disconnect switch in the high-voltage plane of the supply system is opened and the generator in the high-voltage plane is adjusted down at its output, at least to the voltage value of the low-voltage plane. An even higher operational safety is achieved for the low-voltage plane in that the generator output is adjusted down completely. As a result, the high-voltage plane of the supply system is disconnected from the high-voltage sources. The voltage in the low-voltage plane is furthermore prevented from rising, even in case of a short circuit between the two voltage planes of the supply system, and the consumers in the low-voltage plane can continue to be operated safely.

The following advantages are achieved with the invention.

Motor vehicles are equipped with two-voltage supply systems to provide high-performance consumers, e.g., rear window heaters, seat heaters, heating systems in addition to the engine heating, electrical drive motors etc., with a high-voltage plane, while electronic control devices, which are primarily configured with semiconductor elements, can continue to be supplied by a second low-voltage plane. In addition, two-voltage supply systems offer the advantage of an optional second and redundant backup plane for safety-relevant functions in motor vehicles, such as ESP systems, ABS systems or airbag control devices if one voltage plane in the supply system fails.

With the invention, it is possible to protect a second low-voltage plane not only against a short circuit to ground, but also against a possible voltage coupling between the different voltage planes of a multiple voltage supply system. As a result, the invention advantageously permits connecting the safety-relevant electrical and electronic components of a motor vehicle in the low-voltage plane and to further improve the operational safety of the motor vehicle by protecting the low-voltage plane.

If external supply sources are connected to multiple voltage supply systems, for example for charging up the battery in the high-voltage plane, the danger exists that the external high-voltage source is accidentally connected to the low-voltage plane of the supply system. Extensive damage, particularly to semiconductor components, must then be feared in traditional two-voltage supply systems, which would result in extensive repairs. In that case, the invention advantageously protects the low-voltage plane of the supply system against such pole reversal damage.

Present-day motor vehicle supply systems have a supply system management, which distributes the available power reserves to the system consumers on the basis of a priority list. Known supply systems therefore have a supply system control device, which can purposely switch the consumers in the supply system on and off. This functionality of a supply system control device is also used for multiple voltage supply systems. In connection with the invention, the functionality of known supply system control devices can advantageously be expanded to narrow down the location of the undesirable arc-over in the supply system in case of a voltage coupling between the two voltage planes of a two-voltage supply system. For this, the complete high-voltage plane of the supply system with all consumers and power branches is initially turned off. Following this, the individual power branches in the high-voltage plane are switched on by the supply system, one after another, in accordance with a priority list. Following each switch-on of a power branch in the high-voltage plane, the voltage-limiting unit in the low voltage plane simultaneously, and parallel thereto, conducts a check as to whether the voltage in the low-voltage plane increases above the permissible nominal value. If the voltage in the low-voltage plane increases above this nominal voltage inclusive of a tolerance range, the undesirable voltage arc-over or short circuit must be searched for between the two voltage planes, in the last power branch switched on by the supply system in the high-voltage plane. As a result, the multiple voltage supply system has a diagnostic capability and the supply system control device is expanded by a diagnostic function for localizing undesirable voltage arc-over between the different voltage planes of the supply system.

Exemplary embodiments of the invention are explained in further detail in the following with the aid of drawings.

DESCRIPTION OF THE PREFERRED EMBODIMENTS

Figure 1:
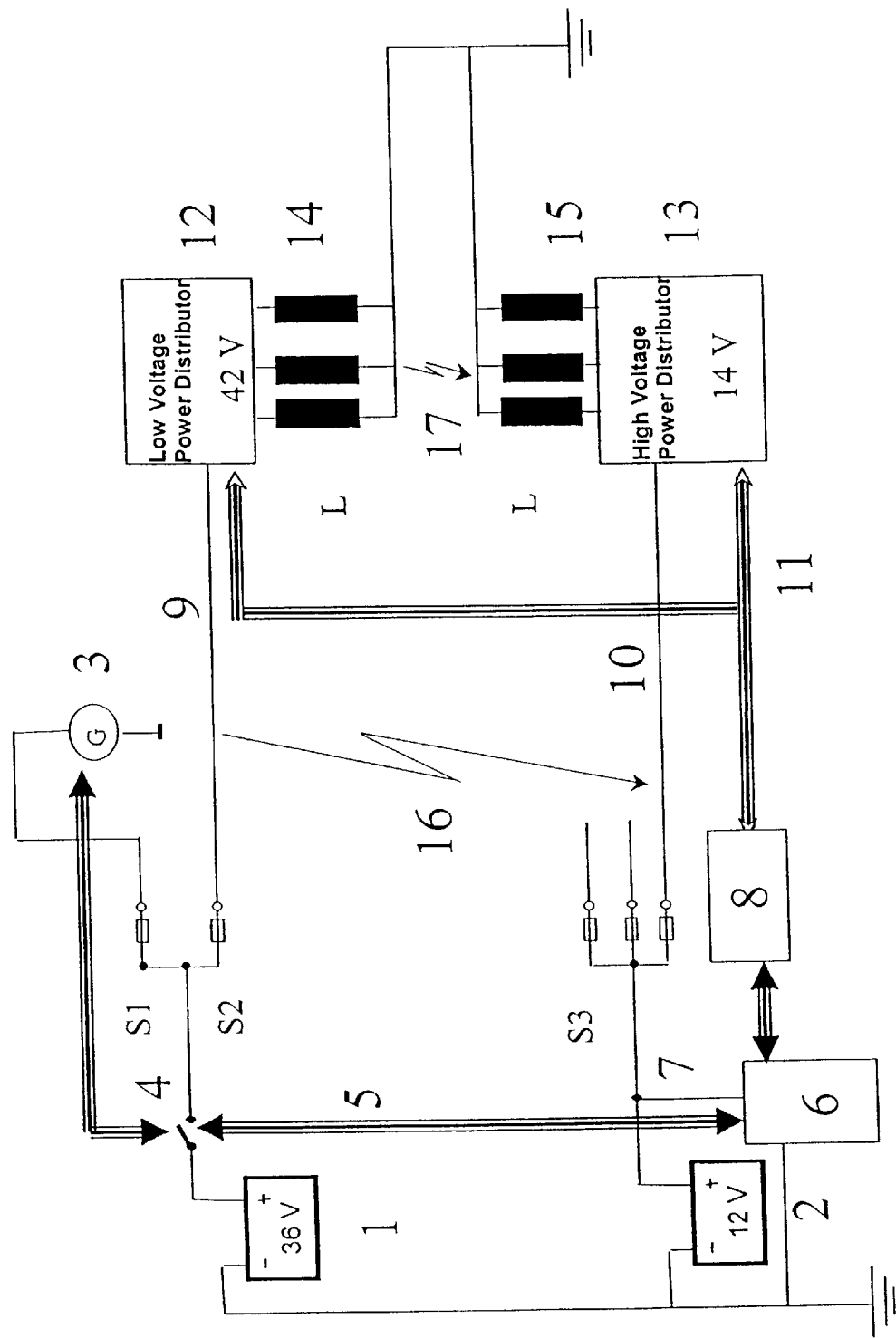
FIG. 1 is a schematic view of a multiple voltage supply system in the form of a 42 V/14 V two-voltage supply system with voltage limiting according to the invention for the low-voltage plane.

FIG. 1 shows a multiple voltage supply system with two different voltage planes U1 and U2. The high-voltage plane U2 comprises a 36 V battery 1, a controllable starter/generator 3, a controllable battery disconnect switch 4, one or several main supply lines 9 for conducting the power from the generator 3 to at least one high-voltage power distributor 12, which distributes the generator power to several power branches 14 in the high-voltage plane. The consumers or loads L of the high-voltage plane are located in the power branches 14. The standard voltage for the high-voltage plane in motor vehicles is 42 V. The high-voltage power distributor 12 is protected against the generator 3 and the battery 1 by a fuse S2 in the supply line 9. The generator 3 is protected against the battery with a fuse S1.

The low voltage plane U1 consists of a 12V battery 2, which is connected via one or several supply lines 10, respectively protected by individual fuses S3, to a low-voltage power distributor 13. The low-voltage power distributor 13 distributes the power in the low-voltage plane to several power branches 15, in which the low-voltage consumers or loads are located. Of course, the low-voltage plane in a motor vehicle will also have a voltage supply independent of the low-voltage battery, for example an additional low-voltage generator, or can be connected via a potential bridge circuit to the high-voltage generator. For the invention, the type of additional voltage supply for the low-voltage plane is not critical. The battery-independent additional low-voltage supply in the low-voltage plane is therefore not shown herein.

A signal supply network exists separate from the multiple voltage supply system. Known signal supply networks in motor vehicles are based on the CAN (controlled area network) technology. The invention shown herein also uses this known signal network technology. The two power distributors 12, 13 from the high-voltage plane and the low-voltage plane, respectively are connected via a CAN bus with signal lines to a supply system control device 8. The supply system control device 8 is also connected via signal lines to the generator 3 or, more precisely, to the generator control that is not shown specifically herein.

The invention supplements the two-voltage supply system shown so far with a voltage limiting unit 6 in the low-voltage plane and a triggered or controllable normally closed battery main switch 4 in the high-voltage plane, as well as a trigger unit for the generator control that depends on the voltage limiting unit 6. In one advantageous embodiment of the invention, the voltage-limiting unit 6 is also connected to the signal network and thus to the supply system control device 8. The voltage limiting unit, however, can also be connected via direct control lines to the supply system control device 8 and/or the battery main switch, even if direct control lines are no longer considered timely in this age of BUS systems.

The function and joint operation of the individual supply system components and the signal network components are explained in further detail in the following.

In case of an undesirable voltage coupling, shown in the drawings with flashes 16, 17, between the two voltage planes U1 and U2, the voltage in the 14 V low-voltage plane U1 is clamped to low voltage with the aid of voltage limiter 6, until the battery disconnect switch 4 is opened and the generator 3 is adjusted back or is adjusted down completely. As a result, the 42V high-voltage plane is separated completely from its voltage sources and cannot feed into the 14V low-voltage plane, not even if a voltage arc-over occurs. An undesirable raising of the voltage level in the low-voltage plane U1 is thus avoided, and the consumers or loads in the 14V low-voltage plane can continue to be operated safely. In addition, the danger to loads and cables that cannot be disconnected is reduced as well. If the electrical devices necessary for the secure operation of the motor vehicle are arranged in the low-voltage plane of the supply system, then the motor vehicle can continue to be operated safely, even in case of a short circuit between both voltage planes.

The voltage-limiting unit 6 measures the voltage in the 14 V low-voltage plane. If the voltage reaches a threshold value, then the voltage-limiting unit 6 limits the voltage in that a power branch in the signal limiting unit itself changes over to the conducting state. The voltage limiter 6, however, does not short-circuit the 14 V against ground potential, but only prevents the voltage from exceeding a voltage threshold by increasing the current through the power branch. Thus, a sacrificial consumer is added in the signal-limiting unit, which takes up voltage above the permissible threshold value.

The voltage-limiting unit 6 is connected via signal lines to the battery disconnect switch 4 as well as the generator 3. If the limiting function is triggered, a signal is transmitted via the signal line to the generator 3, more precisely the generator control, and to the battery disconnect switch 4. In response to the signal, the battery disconnect switch 4 is opened and the high-voltage battery 1 is separated from the high-voltage level U2. The generator 3 is adjusted down in response to the signal, so that high voltage is no longer fed into the 14 V low-voltage plane.

One alternative is to no longer adjust the generator down completely, but only to a voltage of 13.5 V plus a defined offset. As a result, a possible short circuit between the two voltage planes is no longer supplied and the voltage situation in the 14 V low-voltage plane is determined only by the low-voltage battery 2 and, if necessary, the adjusted-down generator 3.

One advantageous embodiment of the invention provides that the voltage-limiting unit 6 is connected via a signal line to the supply system control device 8. When the voltage limiter responds, a signal is transmitted to the supply system control device 8. Using a restart scenario, this signal ensures that initially all loads are switched off in the high-voltage plane. Following that, the battery-disconnect switch 4 can be closed and the voltage at the generator output is once more adjusted upward. If a voltage increase in the 14 V supply system is once again detected, the short circuit cannot be separated. The sources in the 42 V high-voltage plane remain shut down or limited to the low-voltage plane level. If no voltage increase occurs, then the consumers in the power branches 14 of the high-voltage plane must again be connected successively (possibly based on a priority list). Following each startup of another consumer, the voltage situation in the 14 V net is checked. If the voltage increases, then the short circuit is located in the last power branch that is added and this branch is blocked by the power distributor until the short circuit is corrected in an authorized repair facility of the vehicle manufacturer, e.g., DaimlerChrysler AG. If no further voltage increases appear in the low-voltage plane during the continued adding of the remaining power branches 14, these can be added, the capacity of generator 3 can be adjusted upward to its high-voltage value and the battery disconnect switch 4 closed. The complete multiple voltage supply system is thus fully operational, with the exception of the power branch where the short-circuit was localized and which was blocked. The multiple voltage supply system for this advantageous embodiment, in which the voltage-limiting unit is signal-technically connected to the supply system control device, thus has the ability to self-diagnose and block malfunctioning power branches, so that power branches without malfunctions can remain operable.

Figure 2:
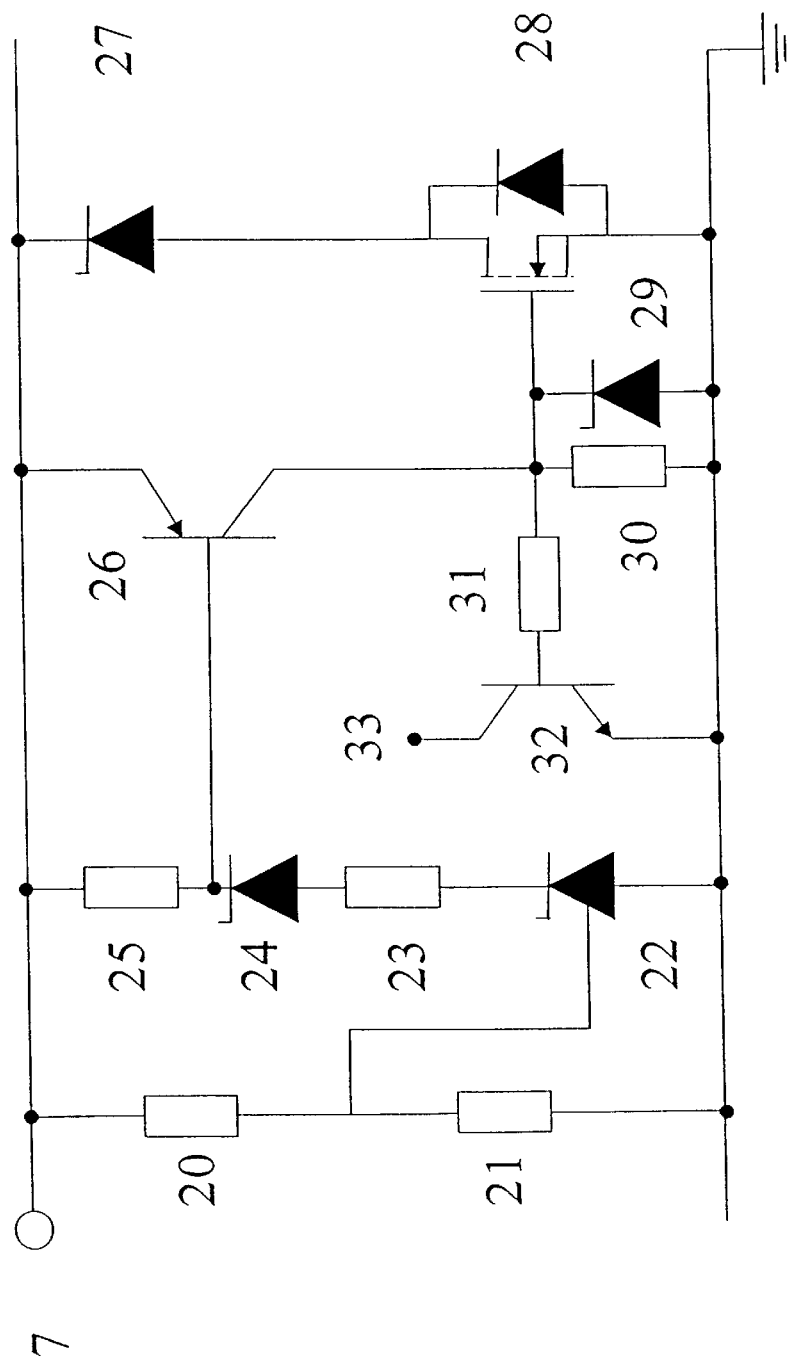
FIG. 2 illustrates an optional exemplary embodiment of a voltage limiter, suitable for the invention, which is known per se from DE 197 10 073 A1.

FIG. 2 shows an embodiment known per se from DE 197 10 073 A1 for an optional voltage-limiting unit 6. Shown is the exemplary embodiment from FIG. 5 in DE 197 10 073 A1. This voltage-limiting unit was selected as an option for the invention shown herein because it has an additional signal connection 33, with which an identification signal can be transmitted to the supply system control device. In principle, however, the voltage-limiting units shown in FIGS. 3 and 4 of DE 197 10 073 A1 can also be used for the invention. The last-mentioned voltage limiting units must only be supplemented with a signal tap, e.g. at the gate for the MOSFET that controls the sacrificial consumer or load.

The joint operation between the voltage-limiting unit known per se and the arrangement according to the invention is explained in the following.

The voltage-limiting unit 6 of FIG. 2 is connected with respect to potential in the low-voltage plane, between the battery main cable and ground. For this purpose, the voltage-limiting unit 6 is connected with its power connection to a symbolically shown terminal 7 and is connected with its ground line to the ground for the multiple voltage supply system. The voltage in the 14 V low-voltage plane is divided down via the two resistors 20 and 21. If the divided-down voltage exceeds the reference value of the reference voltage source 21, it changes over from a high-impedance to a low-impedance state. As a result, current can flow through the resistor 25, the transistor 26 is adjusted upward and the gate voltage at the MOS transistor 28 is raised. This transistor 28 becomes conducting and a current starts flowing in the sacrificial branch, which consists of the series connection or several parallel-connected suppressor diodes 27 and one or several parallel-connected transistors 28, with only one diode and one transistor 28 being shown. The gate-source voltage of the transistor 28 is controlled by this circuit, such that the voltage drop across the transistor 28 corresponds to the difference between the preset threshold value U1 of the low-voltage plane and the voltage drop across the suppressor diode 27. Thus, the tolerances, the internal resistance-dependent voltage drop, as well as the temperature dependencies of the sacrificial consumers in the sacrificial branch are compensated.

The elements 24, 23, 30 and 29 serve as a reverse voltage divider and are not absolutely necessary for the operation.

Triggering the transistor 28 simultaneously also triggers the transistor 32. As a result, the voltage at the output 33 can be transmitted further as a signal to the battery disconnect switch 4, the generator 3 or the generator control and/or the supply system control device 8, for example, via a so-called pull-up resistance that is known per se and is not shown herein.

Another advantage of this configuration is that in case of a pole reversal of the 14 V low-voltage plane, the voltage in the 14V supply system is also limited. In that case, the power branch becomes conducting in that the suppressor diode is operated in forward direction with an inception voltage between 0.7 and 1 V and the inverse diode of the transistor 28 also switches through. Thus, the voltage in the 14V supply system is initially limited to values around negative 2V.

The invention now being fully described, it will be apparent to one of ordinary skill in the art that many changes and modifications can be made thereto without departing from the spirit or scope of the invention as set forth herein.

What is claimed is:

1. An arrangement for protecting a multiple voltage supply system against voltage coupling between a high-voltage plane and a low voltage plane or against a pole reversal, with the high voltage plane including a high voltage battery, a controllable generator connected to the high voltage battery, and at least one high voltage load connected to the battery and the generator, and with the low-voltage plane including a low voltage battery and at least one load connected to the low voltage battery, said arrangement comprising a voltage-limiting unit connected, as to potential, between battery in the low-voltage plane and electrical ground to limit the voltage at said low voltage plane;

a normally closed controllable battery disconnect switch connected in the high-voltage plane to disconnect the high voltage battery from the generator and the at least one load when opened; and control signal lines connecting control terminals of the voltage-limiting unit, the battery disconnect switch and the generator to each other; and wherein the voltage limiting unit includes circuit means for, upon detection of an undesirable voltage coupling from the high-voltage plane to the low-voltage plane, keeping the voltage in the low-voltage plane constant, and for transmitting a signal via the signal lines (a) to the battery disconnect switch to open the switch and separate the high-voltage plane from the high-voltage battery, and (b) to the control terminal of the generator and to adjust the output voltage of the generator down.

2. An arrangement according to claim 1, wherein the voltage-limiting unit, the battery disconnect switch and the control terminal of the generator additionally are connected via signal lines to a supply system control device.

3. An arrangement according to claim 2, further comprising:

a high-voltage power distributor connected in the high voltage plane and distributing the potential to a plurality of power branches, each having a respective high voltage load;

and signal control lines connecting the high-voltage power distributor to the supply system control device.

4. An arrangement according to claim 1, wherein the voltage limiting unit includes a power branch with at least one controllable sacrificial load consumer connected between the low voltage plane and electrical ground.

5. A method for protecting a multiple voltage supply system against undesirable voltage coupling between a high-voltage plane and a low-voltage plane or against pole reversal, comprising:

connecting a voltage-limiting unit, as to potential, between the low-voltage plane and electrical ground, and, via the voltage limiting unit, keeping the voltage in the low-voltage plane constant in case of an undesirable voltage arc-over by connecting a sacrificial load between the low voltage plane and electrical ground;

and shutting down or adjusting down voltage sources in the high-voltage plane by a control device during an undesirable voltage coupling.

6. A method according to claim 5, wherein the control device is integrated into the signal-limiting unit.

7. A method according to claim 5, wherein the control device is a supply system control device used for the load management of the supply system.

8. A method according to claims 5, wherein one of the voltage sources in the high voltage plane is a controllable generator that is shut down or adjusted down in case of a voltage arc-over.

9. A method according to claim 7, wherein the output voltage at the generator is adjusted down to at least the nominal voltage of the low-voltage plane or is adjusted down completely in case of a voltage arc-over.

10. A method according to claim 7, wherein the supply system control device is connected to a high-voltage power distributor for a plurality of power branches in the high-voltage plane; and said method further comprises:

in case of a voltage arc-over shutting down all power branches in the high-voltage plane in a first step:

thereafter, in an additional, second step, switching on a first power branch in the high-voltage plane and adjusting the output voltage of generator upward via the nominal voltage of the low-voltage plane;

in a third step, checking the voltage in the low-voltage plane; and, cyclically repeating the second and third steps successively for additional power branches in the high-voltage plane until a voltage increase occurs in the low-voltage plane following the renewed switching on of a power branch, and shutting down this power branch in case an excessive voltage increase in the low voltage plane is detected.

11. The method according to claim 10 further comprising using the method for localizing an undesirable voltage arc-over or short-circuit between one of the power branches in the high-voltage plane and the low-voltage plane.

12. A method for protecting a multiple voltage supply system having a high-voltage plane and a low voltage plane comprising using an arrangement according to claim 1 for protecting the low-voltage plane against pole reversal from the outside.

* * * * *